(12) United States Patent
Fortmann

(10) Patent No.: US 11,920,568 B2
(45) Date of Patent: Mar. 5, 2024

(54) WIND TURBINE

(71) Applicant: Siemens Gamesa Renewable Energy Service GmbH, Hamburg (DE)

(72) Inventor: Jens Fortmann, Berlin (DE)

(73) Assignee: Siemens Gamesa Renewable Energy Service GmbH, Hamburg (DE)

(*) Notice: Subject to any disclaimer, the term of this patent is extended or adjusted under 35 U.S.C. 154(b) by 0 days.

(21) Appl. No.: 17/420,923

(22) PCT Filed: Jan. 7, 2020

(86) PCT No.: PCT/EP2020/050193
§ 371 (c)(1),
(2) Date: Jul. 6, 2021

(87) PCT Pub. No.: WO2020/144169
PCT Pub. Date: Jul. 16, 2020

(65) Prior Publication Data
US 2022/0069584 A1   Mar. 3, 2022

(30) Foreign Application Priority Data

Jan. 7, 2019   (DE) .................... 10 2019 000 025.0

(51) Int. Cl.
*F03D 9/00* (2016.01)
*F03D 7/02* (2006.01)
(Continued)

(52) U.S. Cl.
CPC .......... *F03D 9/255* (2017.02); *F03D 7/0284* (2013.01); *H02J 3/001* (2020.01); *H02J 3/50* (2013.01); *H02J 2300/28* (2020.01)

(58) Field of Classification Search
CPC .. F03D 7/0284; F03D 9/255; F05B 2220/706; F05B 2270/1033;
(Continued)

(56) References Cited

U.S. PATENT DOCUMENTS 9,631,608 B2 * 4/2017 Garcia ................... H02P 9/102
2013/0175800 A1  7/2013 Bluhm et al.
(Continued)

FOREIGN PATENT DOCUMENTS

CN   107785909 A    3/2018
DE   102013001173 A1  8/2014
(Continued)

OTHER PUBLICATIONS

International Search Report and Written Opinion dated Feb. 26, 2020, directed to International Application No. PCT/EP2020/050193; 19 pages.

*Primary Examiner* — Julio C. Gonzalez
(74) *Attorney, Agent, or Firm* — Morrison & Foerster LLP

(57) ABSTRACT

A wind turbine comprising a converter connected to a generator, which converter supplies at least some of the energy generated by the electrical generator into an electrical grid, sensors for interference in the electrical grid and a controller module for controlling the converter and/or the wind turbine. The controller module comprises a grid interference module which, in the case of detected interference in the electrical grid, counteracts the interference. The controller module comprises an override module which, in the case of a detected interference in the grid, is provided in order to deactivate the grid interference module at least in part. This improves the behavior in interference situations in that the controller module detects, over the course of the interference, that at least parts of the inherent grid stabilization functions do not counteract the interference and, in this specific situation, it deactivates the respective harmful grid stabilization functions.

8 Claims, 2 Drawing Sheets

(51) Int. Cl.
  *F03D 9/25* (2016.01)
  *H02J 3/00* (2006.01)
  *H02J 3/50* (2006.01)

(58) Field of Classification Search
  CPC ..... F05B 2270/402; H02J 3/381; H02J 3/001;
             H02J 3/48; H02J 3/50; H02J 2300/28;
                         H02J 3/38; Y02E 10/76
  See application file for complete search history.

(56) References Cited

U.S. PATENT DOCUMENTS

| | | |
|---|---|---|
| 2017/0104429 A1 | 4/2017 | Andersen et al. |
| 2017/0314534 A1* | 11/2017 | Gupta ..................... H02J 3/381 |
| 2018/0128243 A1 | 5/2018 | Deng et al. |
| 2020/0161868 A1* | 5/2020 | Park ........................ H02J 3/385 |

FOREIGN PATENT DOCUMENTS

| | | |
|---|---|---|
| EP | 2863513 A2 | 4/2015 |
| EP | 3012938 A1 | 4/2016 |
| WO | 2020/144169 A1 | 7/2020 |

* cited by examiner

WIND TURBINE

CROSS-REFERENCE TO RELATED APPLICATIONS

This application is a U.S. national stage application under 35 USC 371 of International Patent Application No. PCT/EP2020/050193, filed Jan. 7, 2020, which claims the priority of DE Application No. 10 2019 000 025.0, filed Jan. 7, 2019, the entire contents of each of which are incorporated herein by reference.

FIELD OF THE DISCLOSURE

The invention relates to a wind turbine having a generator and a converter connected to the generator which, in the event of identified interference on the electrical grid, are provided for counteracting the interference on the grid.

BACKGROUND OF THE DISCLOSURE

Wind turbines are an essential source of energy in the energy supply on the electrical grid and will in the future make an ever greater contribution. In principle, in this case, the power available from wind turbines remains plannable only to a limited extent. With the ever increasing proportion of wind energy on the electrical distribution grid, the demands of the operators of electrical grids on the wind turbines have increased and are being continually developed.

In principle, the demands of the grid operators have until now been based on the properties of conventional power stations, and corresponding properties are expected from the wind turbines. Conventional power stations are predominantly synchronous generators which are connected directly to the grid, whose regulation possibilities differ from the generators of the wind turbines which are connected via converters, and whose regulation strategies for stabilizing the transmission and distribution grids need to be different dependent on the system. The demands of the grid operators, however, have until now barely taken these differences into consideration.

For example, it is in the meantime required that wind turbines need to be able to ride through voltage dips down to 0% residual voltage of the nominal voltage on the grid without disconnection from the grid and at the same time need to inject reactive power or reactive current into the grid in order to counteract the dip in the line voltage. Furthermore, it is required that wind turbines also need to be tolerant of changes in the line frequency, for example in a range of from 46.5 Hz to 53.5 Hz on a 50 Hz grid. At the same time, in the event of a threshold frequency of, for example, 50.1 Hz being exceeded, the active power output of the wind turbine needs to be reduced.

These demands placed on wind turbines overlook the fact that, owing to the system-dependent differences in the regulation strategies of the conventional power stations coupled directly to the grid in comparison with the converter-regulated wind turbines, in the event of unfavorable interference on the grid the reactions of the wind turbines to the interference on the grid can counteract the reactions of the conventional power stations, and can thus prevent stabilization of the grid.

BRIEF SUMMARY OF THE DISCLOSURE

According to an aspect of the invention, in the case of a wind turbine comprising a converter, which is connected to a generator and injects at least some of the energy generated by the electric generator into an electrical grid, sensors for interference on the electrical grid, a controller module for controlling the converter and/or the wind turbine, wherein the controller module comprises a grid interference module, which is provided to counteract the interference in the event of identified interference on the electrical grid, provision is made for the controller module to comprise an override module, which is designed to at least partially deactivate the grid interference module in the event of identified interference on the grid.

The inventor has identified that, in the case of quick interference on the grid, conventional power stations, owing to their inertia, cannot react by a quick change in the active power injection. The conventional power station only has the option, for quick regulation of the active power balance, of changing the voltage so that, assuming predominately resistive consumers, the consumption can be changed temporarily until the active power output of the conventional power station has reached new setpoint values. Wind turbines are designed to keep the voltage at their injection point as constant as possible and achieve this by virtue of a voltage-regulated reactive power output. This voltage regulation of the wind turbines is in this case quick in comparison with the active power regulation of the power station. If the grid operator changes the voltage in order to regulate the active power balance on the grid, in unfavorable situations the change in voltage can be at least partially compensated for again by the wind turbines, with the result that the regulation strategy of the power station is insufficiently effective, and stabilization of the grid or compensation of the grid fault is not achieved.

The wind turbine according to aspects of the invention improves these situations by virtue of it identifying over the course of the interference that at least some of the dedicated grid stabilization functions do not counteract the interference and, in this specific situation, it deactivates the respectively damaging and/or ineffective, in relation to the interference, grid stabilization functions (and leaves other, effective grid stabilization functions activated).

The invention, according to various aspects, makes use of the point that, for an analysis as to whether the respective grid stabilization function should remain activated in the specific interference situation on the grid, the characteristic over time of the voltage characteristic variables voltage level and voltage frequency as well as the reactive and active current injection of the wind turbine needs to be evaluated. From the respective characteristics, it can be identified whether and which grid stabilization function needs to remain inactivated or should remain activated.

It will be explained below that deactivation of a grid stabilization function is understood to mean that the grid stabilization function is not called up, switched off or frozen although the measured electrical controlled variable on the grid would demand a response of the grid stabilization function so that no regulating or controlling influence on the controlled variable on the grid comes from the wind turbine. A grid stabilization function can in this case be, for example, any function which primarily targets the influencing of the voltage level or voltage frequency at the measurement point.

This does therefore not mean functions which are primarily for the safety of the wind turbine or are intended to protect the components of the wind turbine from damage, which in particular also need to remain activated during interference on the grid.

Interference on the grid is intended to mean any change in the measured variables on the electrical grid in which the value of the variable departs from a predefined limit value range or the gradient of change of the variable exceeds a specific level. The term interference should also include the onset of a predefined sequence of events or the onset frequency of a predefined event being exceeded.

If the regulation of a power is described here, a person skilled in the art will understand this to mean likewise obvious alternatives, such as the regulation of only the current or only the voltage and, in the case of active or reactive power, likewise the individual aspects of the power, i.e. the respective currents or voltages should be understood. Reactive power in this context can also be understood to mean the reactive current, the fundamental displacement factor, power factor or phase angle.

Preferably, the grid interference module comprises at least one frequency interference module for regulating the active power output as a function of the frequency on the grid and a reactive power interference module for regulating the reactive power as a function of the voltage on the grid, wherein the override module is designed to deactivate each module of the grid interference module individually and independently of one another.

In a preferred development, provision is made for the controller module to comprise a signal input, which, in the case of a present signal, activates the override module in such a way that it at least partially deactivates the grid interference module.

In addition, the invention relates to a method for controlling a wind turbine.

BRIEF DESCRIPTION OF THE FIGURES

The invention will be described by way of example below with reference to the attached drawings using an advantageous embodiment. With respect to all of the details according to the invention which are not explained in any more detail in the text, express reference is made to the drawings, in which.

DETAILED DESCRIPTION OF THE DISCLOSURE

Figure 1:
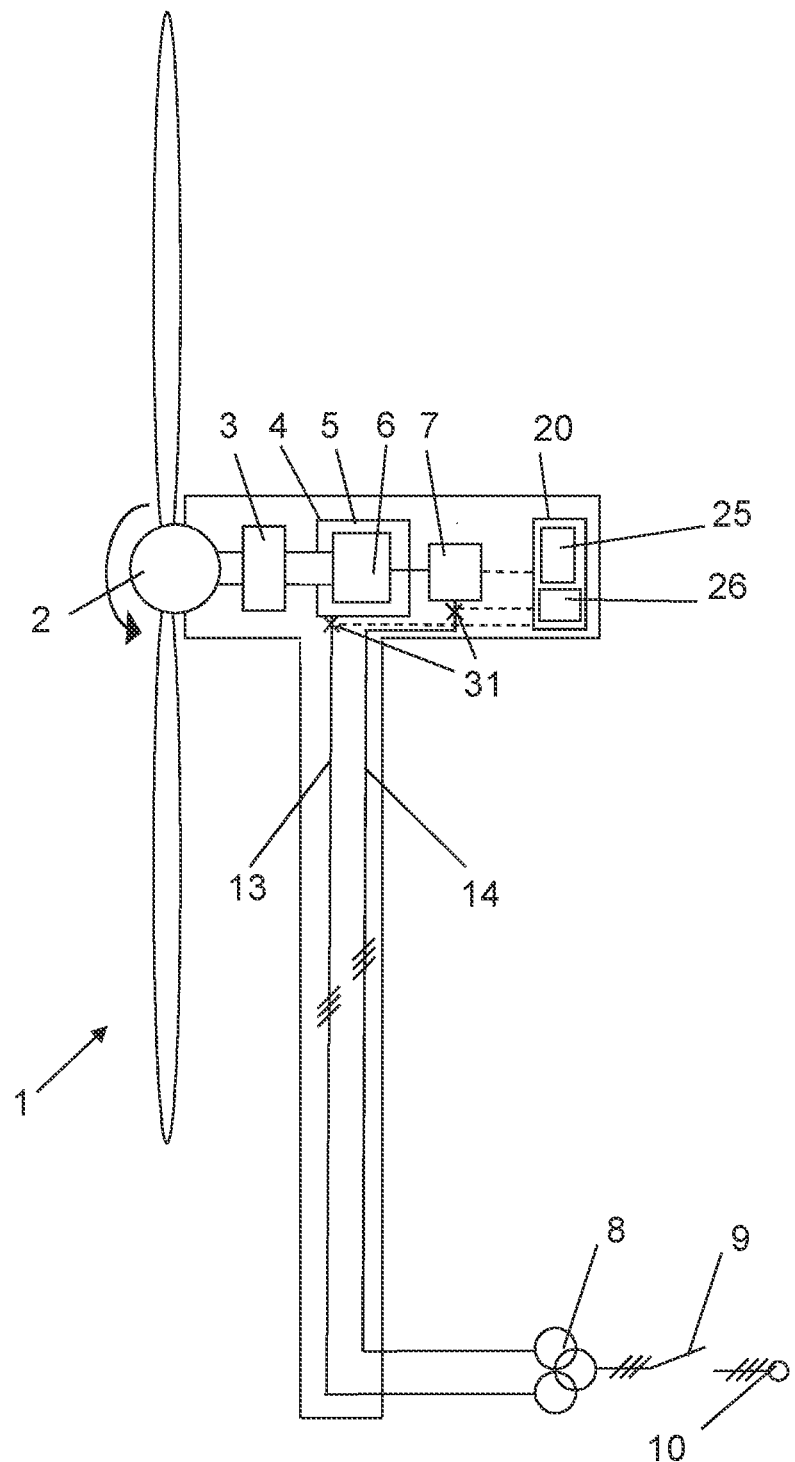
FIG. 1 shows a wind turbine.

The design of the wind turbine will be explained briefly with reference to FIG. 1. The wind rotor 2 of the wind turbine 1 is set in rotation by the wind. The wind rotor 2 is in this case mechanically connected to the generator 4 via a gear mechanism 3 and sets the rotor 6 of the generator 4 in rotation. The stator 5 of the generator is connected to the electrical grid 10 via power cables in the tower 13, a transformer 8 and a switch disconnector 9. The rotor 6 of the generator 4 is connected to a converter 7, which in turn is likewise connected to the electrical grid 10 via power cables in the tower 14, a transformer 8 and a switch disconnector 9. The converter 7 has a converter controller 20, which regulates the converter 7. Measuring sensors 31 are arranged at the power cables 13, 14 in order to measure the electrical variables of the grid 10 and to pass said variables on to the converter controller 20 via measurement lines. If interference of the electrical variables of the grid 10 is established, a grid interference module 25 can be activated in the converter controller, which grid interference module, for its part, can be deactivated by the override module 26.

Figure 2:
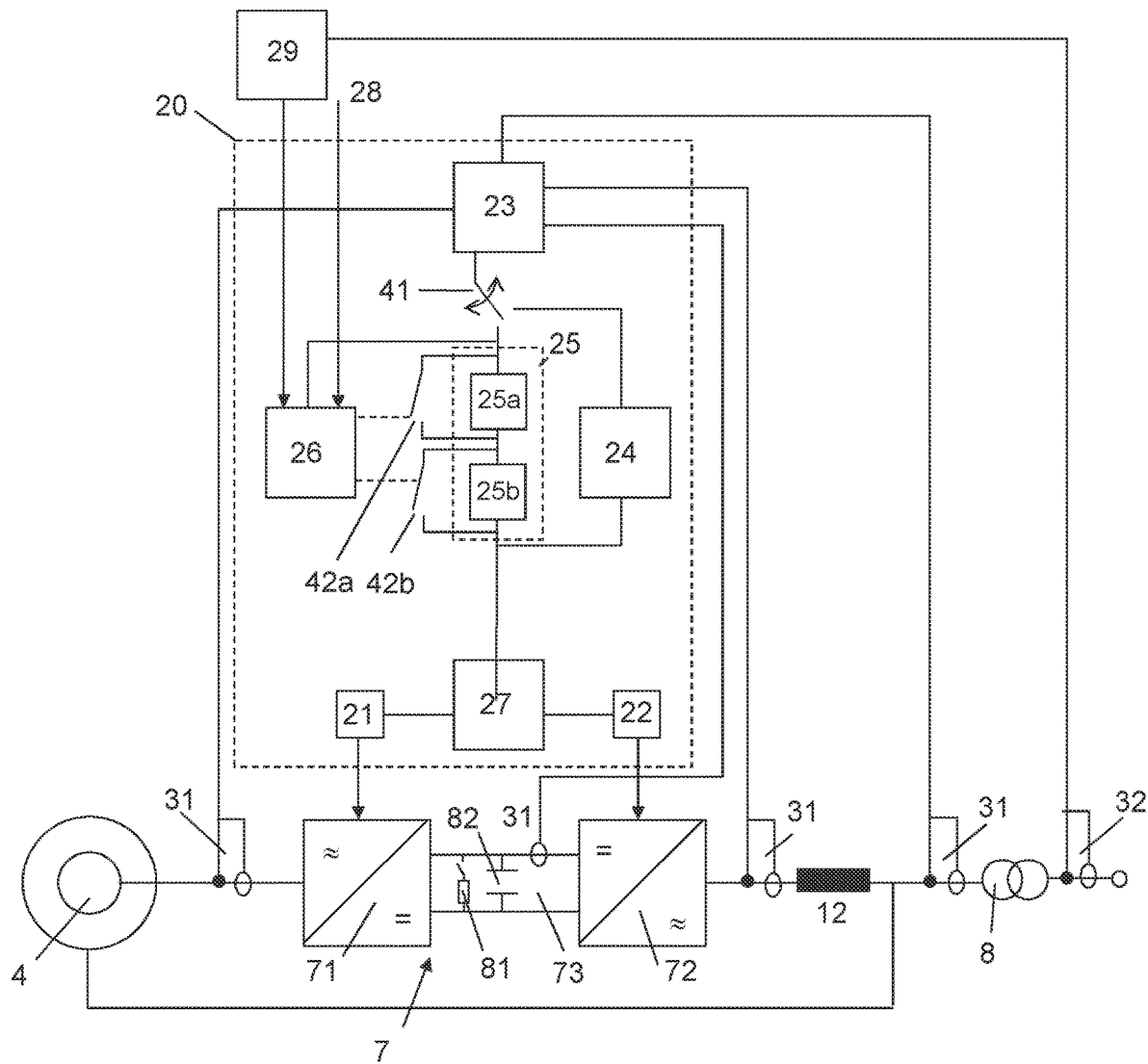
FIG. 2 shows the converter controller according to aspects of the invention.

FIG. 2 shows the basic design of a wind turbine according to the invention. A converter 7 having generator-side inverter 71, DC link 73 and grid-side inverter 72 is connected to the generator 4. The DC link 73 comprises, in a manner known per se, a capacitor 82 as energy store and a chopper 81 as safety device. An inductor 12 is arranged at the output of the grid-side inverter 72. The converter 7 is regulated by a controller 20. Electrical variables are measured at various points in the wind turbine 1 and/or the electrical grid 10 by current and/or voltage sensors 31, 32, which have a direct or indirect coupling to the grid 10, wherein the measured values of said sensors make it possible to establish discrepancies in the electrical variables of the grid 10 from the normal range. The measured values are transmitted to the input of an interference detector 23 of the converter controller 20 and, if there is no interference on the electrical grid 10, the normal regulating module 24 for normal operation is activated by the decision module 41. In the normal regulating module 24, reactive and active power are set in accordance with the by the operator of the wind turbine, the farm controller or the preset control presets. When the normal regulating module 24 is activated, the essential regulation targets are the injection of as high an active power as possible whilst at the same time maintaining contractually agreed reactive power quantities or, in the case of a voltage-oriented regulation, the injection of so much reactive power that the preset voltage ranges are not left.

The normal regulating module 24 determines, on the basis of the values measured by the sensors 31, 32, the setpoint values for the reactive and active powers and transmits these to the power controller 27, which adjusts the setpoint values via the individual converter controllers 21, 22.

If interference on the grid is identified by an interference detector 23, the decision module 41, interacting with the interference detector 23, activates the grid interference module 25, which has regulation targets which differ from the normal regulating module 24 and which it achieves by means of changed controllers. The grid interference module 25 comprises modules 25a, 25b for voltage-dependent power factor correction or frequency-dependent active power regulation, wherein regulation functions which coincide with the presets of the operators of the grid 10 for interference can be stored in these modules 25a, 25b.

If there is interference on the grid for which the grid interference module 25 needs to be activated by the decision module 41, the override module 26 determines simultaneously whether there is interference for which activation of the grid interference module 25 would not stabilize the grid. If the override module 26 identifies such interference, at least parts of the grid interference module can be bypassed (by means of override switches 42a, 42b) and thus prevent regulating intervention in the grid parameters by the bypassed function.

The power controller 27 thus does not receive any new setpoint values, and the converter 7 does not change its output currents.

As an alternative, it is also conceivable for the override module 26 to act on the decision module 41 in such a way that at least parts of the control loop are controlled by the normal regulating module 24, with the result that, despite the interference on the grid 10, the regulation of the electrical variables is functional.

The override module 26 is additionally also configured in such a way that it can receive, at least indirectly, signals from the controller of the wind farm 29 or, via a signal input 28, from the operator of the grid 10. By virtue of these signals, the override module 26 can be activated or deactivated, with the result that optimum grid support by the wind turbine 1 is always ensured externally. The controller of the wind farm 29 has dedicated sensors 32, which are arranged upstream of the wind turbine on the grid 10 and can detect interference on the grid 10 earlier or more directly or can monitor the effect of the powers output by the wind turbine 1, with the result that the controller of the wind farm 29 can activate or deactivate the grid interference module 25 in a targeted manner.

The figures only show a wind turbine with a double-fed asynchronous generator, in which only some of the output electrical power is transmitted from the converter to the electrical grid. The invention can likewise be used in configurations in which other types of generators are used and the total generated electrical power is conducted via the converter.

The invention claimed is:

1. A wind turbine comprising a converter which is connected to a generator and injects at least some of the energy generated by the electric generator into an electrical grid, sensors for detecting interference on the electrical grid, and a controller for controlling the converter, wherein the controller is configured to perform a plurality of grid stabilizing functions for counteracting the interference on the electrical grid, to classify the interference, and in the event of detected interference on the electrical grid, to deactivate a portion of the grid stabilizing functions while keeping a remaining portion of the grid stabilizing functions active for counteracting the grid interference as long as interference continues, wherein the classification of the interference is performed using time history of voltage and frequency of the voltage.

2. The wind turbine of claim 1, wherein the controller regulates active power output as a function of frequency on the grid and regulates reactive power as a function of voltage on the grid, and wherein the controller is configured to be deactivated from regulating the active power output and the reactive power individually and independently of one another.

3. The wind turbine of claim 1, wherein the controller comprises a signal input, which, in the case of a present signal, causes the controller to deactivate the portion of the grid stabilizing functions.

4. A method for controlling a wind turbine comprising a converter which is connected to a generator and injects at least some of the energy generated by the electric generator into an electrical grid, sensors for detecting interference on the electrical grid, and a controller for controlling the converter, wherein the controller has a plurality of grid stabilizing functions, the method comprising:
   identifying electrical interference on a grid,
   classifying the interference,
   deactivating a portion of the grid stabilizing functions, and
   counteracting the interference on the grid using a remaining portion of the grid stabilizing functions,
   wherein the classifying is performed using time history of voltage and frequency of the voltage.

5. The method for controlling a wind turbine of claim 4, wherein interference in respect of frequency of voltage on the grid is identified, and a reactive power controller that regulates reactive power output as a function of the voltage on the grid is deactivated.

6. The method for controlling a wind turbine of claim 4, wherein interference in respect of voltage on the grid is identified, and a frequency controller that regulates active power output as a function of frequency is deactivated.

7. The method for controlling a wind turbine of claim 4, wherein the deactivation is preset by a signal from outside the wind turbine.

8. The method for controlling a wind turbine of claim 4, wherein the classification is performed by means of an electrical model.

* * * * *